W. L. RATHBUN.
BANANA PEELER AND METHOD OF PEELING BANANAS.
APPLICATION FILED OCT. 6, 1913.
1,143,135. Patented June 15, 1915.
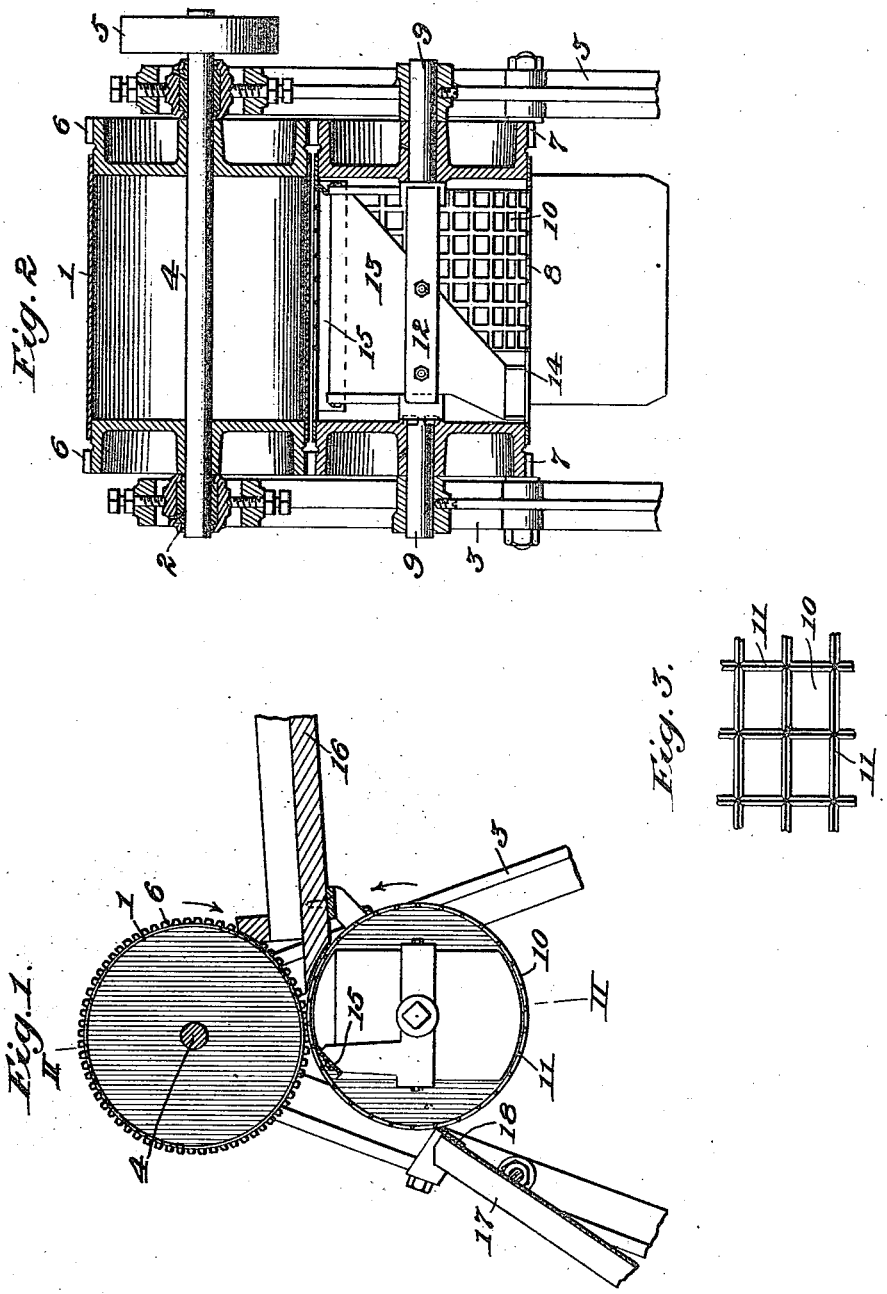

UNITED STATES PATENT OFFICE.

WILLIAM L. RATHBUN, OF NEW YORK, N. Y., ASSIGNOR TO PANAMA BANANA FOOD COMPANY, OF NEW YORK, N. Y., A CORPORATION OF NEW YORK.

BANANA-PEELER AND METHOD OF PEELING BANANAS.

1,143,135.  Specification of Letters Patent.  Patented June 15, 1915.

Application filed October 6, 1913. Serial No. 793,667.

*To all whom it may concern:*

Be it known that I, WILLIAM L. RATHBUN, a citizen of the United States, residing at New York city, in the county of New York and State of New York, have invented certain new and useful Improvements in Banana-Peelers and Methods of Peeling Bananas, of which the following is a specification.

This invention relates to devices for peeling bananas, a primary object of the invention being to provide a simple and compact device, adapted to be operated either by hand or by power, and capable of rapidly separating the flesh of the banana from the skin. The invention contemplates also a method of peeling bananas.

A device constructed in accordance with my invention is illustrated in the accompanying drawings, wherein—

Figure 1 is a central vertical section of a preferred construction; Fig. 2 is a longitudinal section on line II—II of Fig. 1; and Fig. 3 is a fragmentary face view of the lower perforated roll.

In said drawings, 1 represents an upper smooth roll of sheet metal, mounted in bearings 2 carried by an appropriate framework 3. The roll 1 is fixed upon the central shaft 4, and may be driven by means of a pulley 5 or by equivalent means, or by hand. The roll 1 is provided at each end with circumferential racks 6, 6, the teeth of which mesh with the teeth of like racks 7, 7 at each end of the lower roll 8, in such manner that the two rolls rotate together in the direction indicated by the arrows in Fig. 1. The lower roll 8 rotates freely in appropriate bearings upon fixed stub-shafts 9, 9, carried by the frame 3. The lower roll 8 is of sheet metal, and is perforated over that portion of its area which is designed to receive the bananas to be peeled. The perforations, indicated at 10, are preferably rectangular, approximately one-half inch square and are so formed that the metal webs between the apertures present outwardly directed cutting edges 11, as clearly shown in Figs. 1 and 3.

Inside of the lower perforated roll 8, and rigidly mounted on a frame 12 carried by the fixed stub-shafts 9, 9 is a hopper-shaped sheet-metal chute 13, formed to receive the flesh of the bananas and to discharge it through large openings 14 disposed near one end of the roll 8. The frame 12 also carries a fixed knife or scraper blade 15, which serves to cut or scrape the flesh from the interior surface of the perforated roll 8.

16 represents a feed chute for the bananas, previously sliced, as hereinafter described, and 17 a discharge chute for the skins, the chute 17 being provided with a scraper edge 18 bearing against the exterior face of the perforated roll 8.

The rolls 1 and 8 are shown as mounted out of actual contact with each other, and as separated by a space corresponding substantially to the thickness of the skin of the banana, or approximately one-eighth of an inch.

Inasmuch as steel and iron have a tendency to darken the flesh of the banana, all metal parts of the apparatus which come in contact with the flesh, including the lower roll 8 and the scraper blade 15, are either plated with silver or constructed of aluminum or are otherwise formed to present surfaces which are non-injurious to the flesh.

The operation of the apparatus described is as follows: The bananas are cut lengthwise, by hand or by any suitable mechanism, and the halves are fed, flesh side downward, between the spaced rolls 1 and 8. Under the pressure exerted by the upper roll the flesh is forced against the cutting edges 11 and through the perforations 10, and is detached from the skin by the blade 15, and discharged into the hopper 13, falling thence into any proper receptacle. The skins pass between the rolls and fall into the discharge chute 17. The use of a lower perforated roll having outwardly directed cutting edges is highly advantageous, in that it avoids bruising the comparatively firm flesh of the banana, and particularly the flesh of the fruit which is not fully ripe.

The term "cutting edges" is employed in the claims to designate any construction of the lower roll which will enable the flesh of the banana to be forced through the same without bruising or injury, it being of course essential that extended cylindrical surfaces such as would crush or bruise the flesh should be avoided.

While the upper and lower rolls are in my preferred construction definitely spaced apart to avoid such pressure upon the skins as would result in cutting them, it may be practicable under certain conditions at least to arrange the rolls in actual contact or in close juxtaposition, while providing therefor a resilient mounting adjusted to accomplish the above result. Other forms of moving surface, as a belt or apron, are to be regarded as equivalent to a roll for the purposes of this invention, and any means for exerting the proper degree of pressure to force the flesh through the perforations may be substituted for the upper roll.

I claim:—

1. A banana peeler, comprising adjacent movable elements and means for feeding the cut or sliced fruit between said elements, one of said elements having an area presenting apertures separated only by cutting edges, the other of said elements constructed and arranged to force the flesh of the fruit against and past said cutting edges, in combination with means located on the opposite side of said apertured area for removing the flesh therefrom.

2. A banana peeler, comprising adjacent drums, means for rotating said drums, and for feeding the cut or sliced fruit between them, one of said drums having an area presenting apertures separated only by cutting edges, the other of said drums constructed and arranged to force the flesh of the fruit against and past said cutting edges, in combination with means located on the opposite side of said apertured area for removing the flesh therefrom.

3. A method of peeling bananas, consisting in slicing the fruit to expose the flesh, forcing the flesh while still attached to the skin against and past cutting edges from one side thereof, and removing the said flesh from the skin from the other side of said cutting edges.

In testimony whereof I affix my signature in presence of two witnesses.

WILLIAM L. RATHBUN.

Witnesses:
R. A. BAKER,
FRANK HAMMOND.